July 14, 1970 — N. G. NEELEY — 3,520,462

BUTTON STAPLER MACHINE

Filed Dec. 19, 1966 — 4 Sheets-Sheet 1

INVENTOR:
NILE G. NEELEY

ATTORNEY:
CALVIN J. LAICHE

July 14, 1970   N. G. NEELEY   3,520,462
BUTTON STAPLER MACHINE
Filed Dec. 19, 1966   4 Sheets-Sheet 2

INVENTOR:
NILE G. NEELEY
ATTORNEY:
CALVIN J. LAICHE

July 14, 1970     N. G. NEELEY     3,520,462
BUTTON STAPLER MACHINE

Filed Dec. 19, 1966     4 Sheets-Sheet 3

INVENTOR:
NILE G. NEELEY

ATTORNEY:
CALVIN J. LAICHE

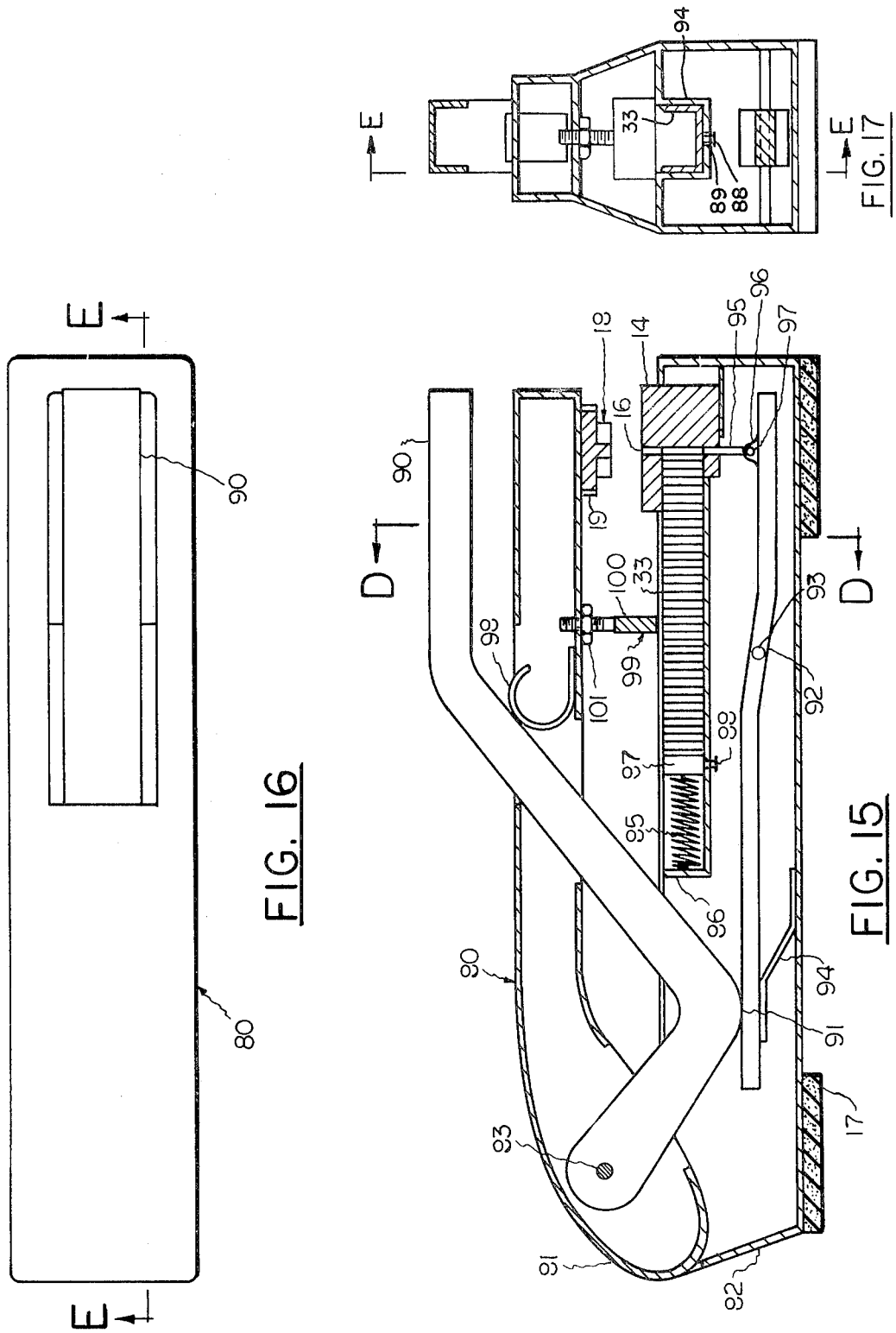

United States Patent Office 3,520,462
Patented July 14, 1970

3,520,462
BUTTON STAPLER MACHINE
Nile Gene Neeley, New Orleans, La.
(300 Ridgelake Drive, Apt. 107, Metairie, La. 70001)
Filed Dec. 19, 1966, Ser. No. 602,616
Int. Cl. A41h 37/00
U.S. Cl. 227—31     6 Claims

ABSTRACT OF THE DISCLOSURE

The present invention pertains to a button stapler machine comprising staple guide means wherein a U shaped staple is utilized for fastening a conventional four hole button to a base material. The clinching anvil is designed such that the U shaped staple is bent through two 90° angles whereby each end of the staple after an operation faces in a direction 180° from its original position such that it passes through all four holes of the button which is strongly attached to the base material and has a finished and pleasing appearance. Frame means and staple driving means are also provided along with related components for performing the intended operation.

---

The present button stapler machine attaches a button to a fabric or the like in a manner quite different from that of present day button stapler machines. There are many types of button stapler machines on the market today which fail to give pleasing results when employing conventional buttons and/or fail to produce an adequate connection between the button and the base material. For this reason, special buttons, together with particular fastening means for attaching the button to the fabric, have been developed. Needless to say, the use of special buttons introduces a factor of inflexibility into a garment manufacturers' operations. Additionally, replacement of special buttons poses a problem in other areas, such as, in laundries and even in the household. Therefore, a button stapler machine utilizing conventional 4-hole buttons which can easily and quickly be attached to a base material would be a welcomed contribution to the art, especially a button stapler machine that is inexpensive to produce.

An object of this invention is to provide a button stapler machine for attaching conventional 4-hole buttons to a base material.

Another object of the instant invention is to provide a button stapler machine that is inexpensive to produce.

A particular object of this invention is to provide an inexpensive button stapler machine whereby a conventional 4-hole button can be easily and quickly fastened to a base material to produce a product which enhances the attractiveness of the overall product.

These and further objects will come to light as the discussion proceeds as well as will be evident from the drawings which depicts a preferred embodiment of the instant invention.

In the drawings:

FIG. 15 represents another embodiment of the present button stapler machine modified for automatic operation whereby buttons can be continually fastened to a base material without the necessity of inserting a staple after each operation, the view illustrated in this figure being taken along the section line E—E of FIG. 17;

FIG. 16 is a plan view of the stapler machine illustrated in FIG. 15; and

FIG. 17 is a sectional elevation view taken along the line D—D of FIG. 15.

Figure 14:
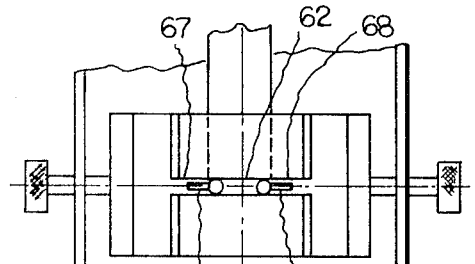
FIG. 14 is a plan view of the adjustable staple guide means illustrated in FIG. 13.
Figure 13:
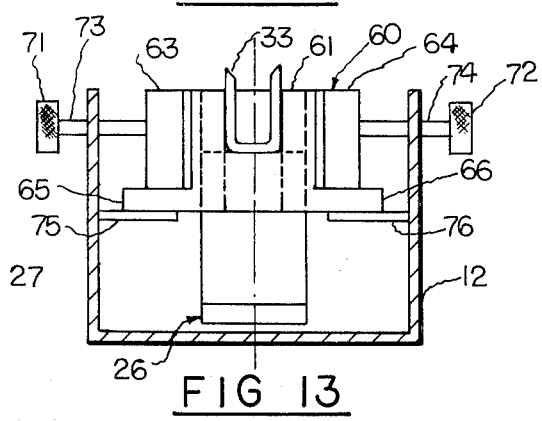
FIG. 13 is an end view with the stapler body shown partly in section which represents another embodiment for employing different sizes of staples in conjunction with the dual anvil means of FIG. 11.
Figure 19:
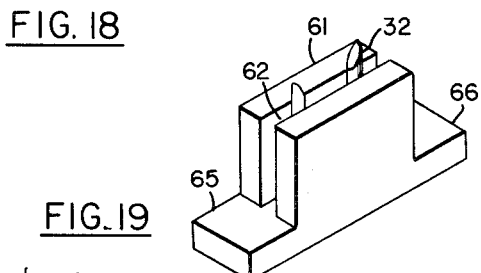

FIG. 19 also is an isolated isometric view of the staple guide components of the embodiment of FIGS. 13 and 14.

Figure 2:
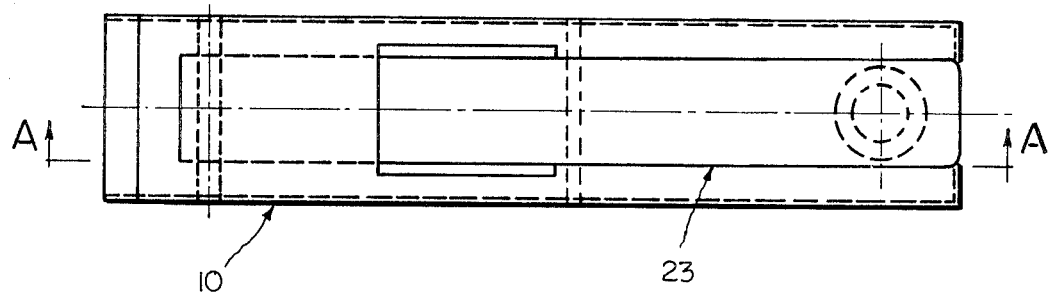
FIG. 2 is a plan view of the embodiment of FIG. 1.
Figure 1:
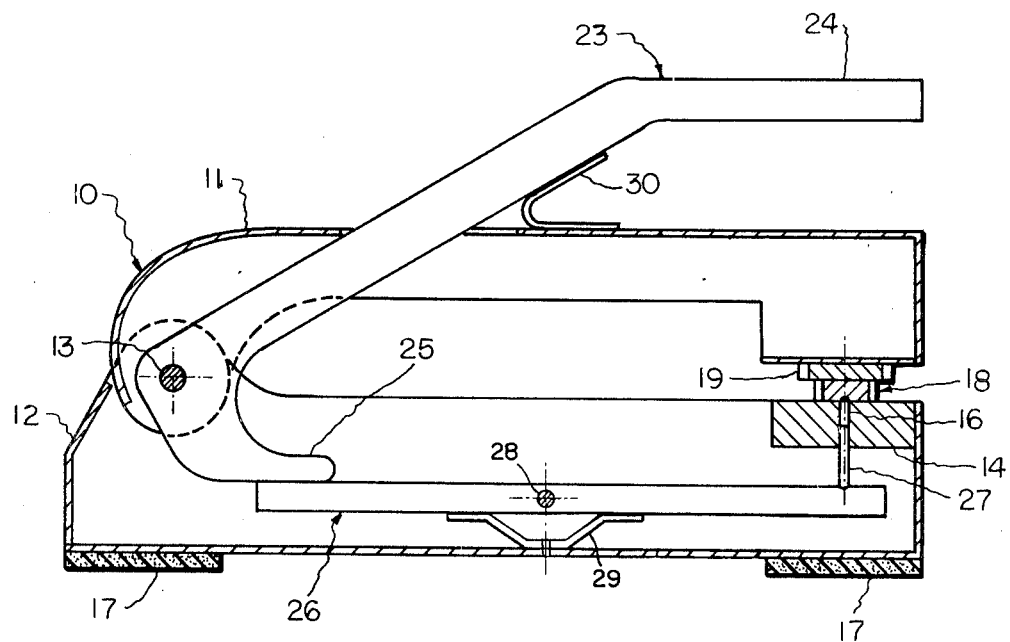
FIG. 1 is a side elevation view of the basic embodiment of the present stapler machine taken along the section line A—A of FIG. 2.

Referring to FIG. 1 in the drawing for a detailed description, the basic embodiment of the present button stapler machine comprises a main frame assembly 10 which further comprises the upper frame member 11 and the lower frame member 12. These two members are operably connected to each other by virtue of the main pin means 13 whereby the members can be pivotally rotated toward each other. The upper frame member 11 is adapted to fit snugly within the extended side portions of the lower frame support member 12 to restrict lateral motion between these members. In this manner, the position of the staple bending guide means or clinching anvil 18 with respect to the staple guide means or rack 14 is accurately maintained. Additionally, the tolerance between the main pin means 13 and the bored portion of the upper frame 11 is maintained fairly close to prevent a loose fit and thus further restrict any lateral movement.

The lower frame support member 12 further comprises the staple guide rack means 14 which is provided with the staple guide channel 16 adapted to receive a staple, the tolerance being sufficient to allow a staple when positioned within the channel or slot 16 to slide easily yet without any lateral motion. The lower frame support is provided, of course, with such refinements as the resting pads 17 and the like.

Figure 3:
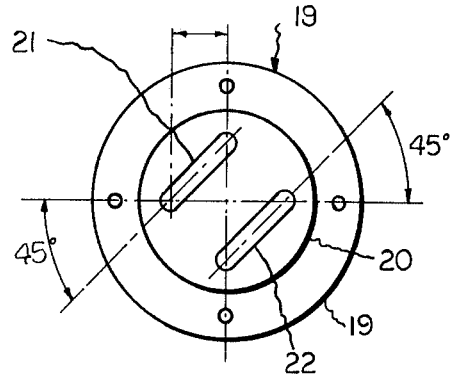
FIG. 3 is a plan view of the staple bending guide means from the side which contacts the staple.
Figure 4:
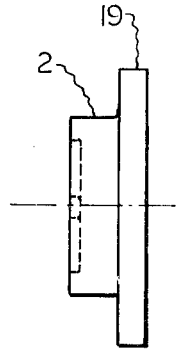
FIG. 4 represents a side view of the staple bending guide means or anvil depicted in FIG. 3.
Figure 11:
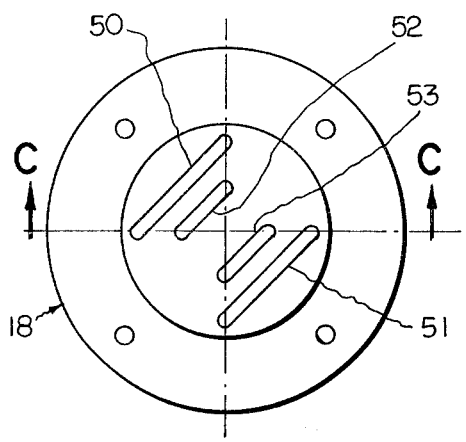
FIG. 11 depicts a modification of the staple anvil means illustrated in FIG. 3 such that two different sizes of staples can be employed whereby two different sizes of 4-hole buttons can be attached to a base material, this anvil design being employed in conjunction with the corresponding mating staple guide means illustrated in FIGS. 9 and 10.

The upper frame member 11 is operably connected to the staple bending guide means or anvil 18. Referring to FIG. 3 in the drawing, the anvil 18 further comprises the flange portion 19 which serves as a base for its attachment to the upper frame member 11. The extended portion 20 of the anvil 18 is provided with the parallel slots 21 and 22 which deforms a staple in the manner described hereinafter. For fastening 4-hole buttons, the guide slots 21 and 22 are positioned on parallel center lines corresponding to those of opposed pairs of holes within the button and are of a length equal to that determined by the center line dimension between adjoining holes within the button. Thus, the center lines of the slots 21 and 22 form opposed sides of the square prescribed by the centers of the individual holes within the button to be fastened to a cloth or base material. The anvil 18 is conveniently fastened to the upper frame member 11 by conventional means, such as by riveting, or the like. To accommodate different or special buttons, the anvil can be connected in a manner whereby it can be quickly and easily detached and replaced by another of suitable design if so desired or modified as illustrated in FIG. 11 as explained in detail hereinafter.

Referring back to FIG. 1, a staple is brought into contact with the anvil 18 by virtue of the staple actuating means 23 which further comprises the handle portion or cam lever arm 24 and the extended portion 25. The member 23 extends through the upper frame member 11 and is provided with a bored portion whereby it is mounted upon and operably connected to the frame by virtue of the main pin means 13. In this manner, the members 23, 11 and 12 are allowed to move relative to each other in the same plane about the common longitudinal axis of the main pin means 13.

Upon being depressed, the lever arm 23 by virtue of the extension 25 contacts the driving lever means 26. The lever 26 further comprises the staple driver or driving plate means 27 connected thereto. The lever 26 is operably suspended within the lower frame support member 12 in a pivotable relationship by virtue of the rest pin means 28 connected or mounted to the side walls of the lower frame support 12. The lever 26 is bored to receive the pin 28 whereby the lever operates in a rocking motion about the longitudinal axis of the pin 28. As brought out above, such motion is induced upon depressing the lever arm 23 whereby its extended portion 25 is caused to move downward thereby pushing the contacting end of the lever means 26 downward. This causes the lever 26 to pivot about the pin 28 whereby its opposite end, to which the driving plate 27 is operably connected, is caused to move upward through the slotted portion 16 of the guide rack 14. In this manner, a staple positioned within the slotted portion 16 of the rack 14 is caused to move into contact with the staple bending means 18. The balance and return spring means 29 is provided to keep the lever 26 in a position whereby the driving plate 27 is retracted after a staple bending operation. The spring 29 is operably positioned between the lower frame support member 12 and the lever 26. It is to be understood, of course, that while the drawing depicts a leaf spring construction, other suitable design of resilient means can be substituted.

The relief spring means 30 is also provided for returning the staple actuating means 23 to a relaxed position after a fastening operation. As shown in the drawings, the spring 30 is positioned between the arm 24 and the upper frame support 12 to which it is attached. Naturally, different types of resilient means positioned elsewhere in the structure of the machine, e.g. a coil spring between the lower frame support member 12 and the extension 25 of the arm 24, can be utilized to produce similar results.

Figure 7:
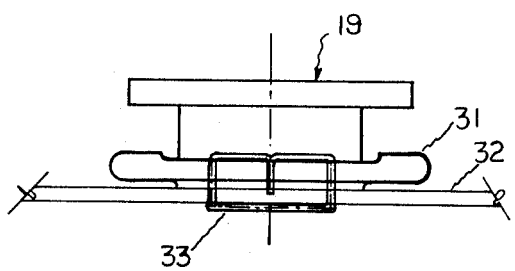
FIG. 7 is an isolated side view of the staple forming means shown in its operable relationship to a button having been fastened to a base cloth shown partly in section, the staple in its deformed condition being shown from a viewpoint taken along a common center line of an opposing pair of holes within a 4-hole button.
Figure 8:
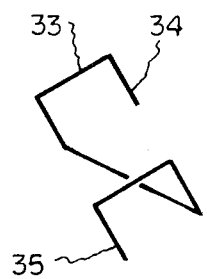
FIG. 8 is an isometric view of a staple after being deformed, this being the shape it assumes in connecting a button to a base material as illustrated in FIG. 7.

In operation, a fabric to which a button is to be attached is placed in the space or slot provided between the upper and lower members of the frame, the button being positioned immediately below and in alignment with the anvil 18 while the fabric is rested upon the guide rack means 16. Referring to FIG. 7 in the drawings, the button 31 is shown connected to the fabric or base material 32 after a stapling operation. The staple 33 has been deformed to assume the bent condition as illustrated in FIG. 8. The deformed staple 33 illustrated in FIG. 7 is shown from a view taken along a line drawn through the centers of an opposed pair of holes within the button 31, e.g. the vertical center line of the isolated view of the anvil 18 shown in FIG. 3. As shown in FIG. 7, the ends 34 and 35 (FIG. 8) of the stapler 3 have been turned down in the respective holes 36 and 37 (FIG. 5) of the button 31.

Figure 6:
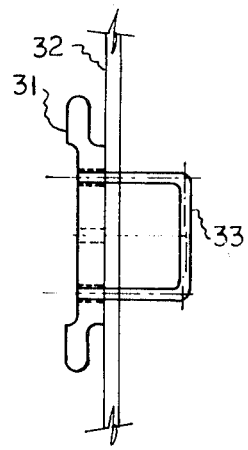
FIG. 6 is a side view of a button to be attached to a base material shown partly in section with the position of the staple being shown in its initial phase passing through the base material and into the first pair of opposite holes within the button.

In the initial phase of a stapling operation, the staple 33 is first inserted within the slot 16 of the guide rack 14, the driving plate 27 in its pre-operation position being of a length sufficient to allow the staple 33 to set completely within the slot 16. Upon depression of the handle 24 which acts upon the lever 26, the driving plate 27 is caused to move upwards through the slot 16, thereby forcing the staple 33 to pass through the cloth 32 and into the button 31 as shown in FIG. 6. The staple 33 continues its motion until it contacts the anvil 18 whereupon its ends are bent at a 90° angle. The ends 34 and 35 are then guided in the slots or grooves 21 and 22 (FIG. 3) whereby they are forced to flow in the plane established by the center line of the grooves 21 and 22 which grooves lie in planes positioned preferably 45° from that established by the U shaped staple initially.

Figure 5:
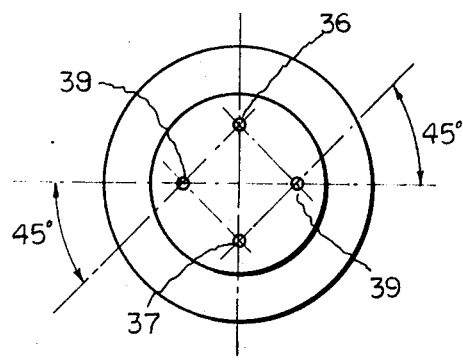
FIG. 5 is a plan view of a conventional 4-hole button showing the initiating position of the staple employed for fastening it to a base material.

Referring to FIGS. 5 and 6, the ends 34 and 35 of the staple after entering the holes 36 and 37 respectively of the button and being deformed by virtue of the grooves 21 and 22, are caused to again change direction 90° downward upon contact with the ends of the grooves 21 and 22, thereby entering the holes 38 and 39 respectively of the button 31. The final deformed condition assumed by the staple 33 is that as shown in FIG. 8. The initial depth or total length of the staple 33 is determined beforehand so as to preferably allow the ends 34 and 35 to be turned downward to a depth sufficient to enter the button hole and contact the cloth, yet insufficient to allow them to pass through the cloth itself. The net result is a very strongly attached 4-hole button which has an attractive appearance.

Figure 9:
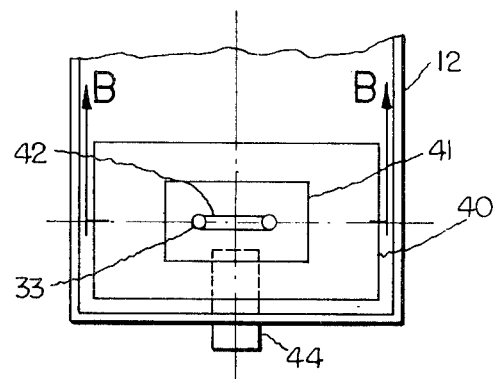
FIG. 9 represents a modification of the staple guide means illustrated in FIG. 1 whereby different sizes of staples can be employed to attach different sizes of 4-hole buttons.

FIG. 9 depicts a modification of the staple guide rack means 14 illustrated in FIG. 1 whereby different sizes of staples can be employed in the present stapler machine for attaching different sizes of 4-hole buttons to a base cloth. The staple guide rack holder 40 is mounted within the lower frame portion 12. The changeable staple guide rack 41 is positioned within the holder 40 in alignment with the driving plate means 27. This assembly is in turn in alignment with the staple anvil means 18. The guide rack 41 is provided with the slot 42 wherein a staple 33 is positioned subsequent to a stapling operation.

Figure 10:
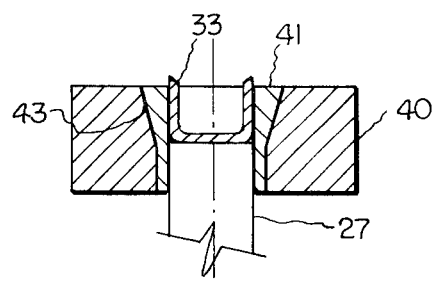
FIG. 10 represents a partial sectional view taken along the line B—B of the staple guide means of FIG. 9.

FIG. 10 is a sectional view of the staple guide rack assembly illustrated in FIG. 9 taken along the line B—B of that figure. The guide rack 41 is provided with the tapered surfaces 43 whereby it assumes a fixed position within the outer holder member 40. As shown in FIG. 9, the staple guide rack 41 is retained within the holder 40 by virtue of the tab, clip or retaining means 44 which extends exteriorly of the frame 12. In this manner, the guide rack 41 can be easily removed upon withdrawal of the tab 44. The tab 44 can comprise a set screw with an enlarged knurled head for easy operation by the fingers. The driving plate 27 can also be replaced simultaneously with the guide rack means 41 and be included therewith as an assembly. In this manner, a perfect fit and ease of operation between these members are assured.

Figure 12:
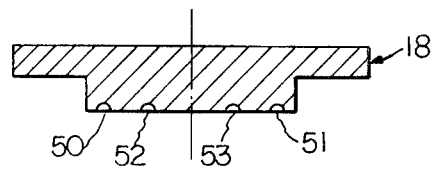
FIG. 12 is a sectional view taken along the center line C—C of the anvil illustrated in FIG. 11.

To accommodate the different sizes of staples made possible by virtue of the modification of FIG. 9, the anvil 18 can be made as illustrated in FIG. 11. The grooves or slots 50 and 51 which correspond to the slots 21 and 22 of FIG. 3 are provided for one size of a 4-hole button. Whereas, the grooves 52 and 53 are provided for a different 4-hole button which naturally has a closer hole spacing. FIG. 12 is a sectional view taken along the line C—C of FIG. 11 showing the depth of the slots 50, 51 52 and 53.

Figure 18:
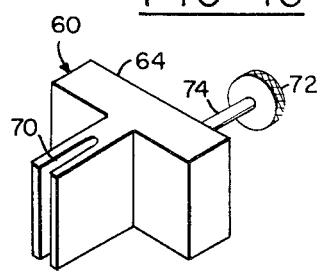
FIG. 18 is an isolated isometric view of the staple guide components of the embodiment of FIGS. 13 and 14.

The staple guide rack 14 can also be modified for use with different sizes of staples as illustrated in FIGS. 13 and 14. The staple guide rack assembly 60 further comprises the main guide frame portion 61, as shown in greater detail in the isolated isometric view of FIG. 19, which is provided with the slot 62. The slidable blocks 63 and 64, as shown in greater detail in the isometric view (64 only shown) of FIG. 18, are provided on opposite sides of the member 61 on which they rest by virtue of the extended portions 65 and 66 respectively. The members 63 and 64 are provided with the extended portions 67 and 68 respectively which extend within the slot 62 of the member 61. In such relationship, the T-shaped adjusting members 63 and 64 allow the length of the slot 62 to be regulated depending upon their relative opposed positions. The extending portion 67 and 68 of the adjusting members 63 and 64 are further defined as including the slots 69 and 70, respectively. The slots 69 and 70 are designed to mate with and allow passage of the driving plate means 27 upwards through the slot 62 into contact with the staple 33 thereby driving it into contact with the anvil means 18. The adjustable members 63 and 64 are operably connected to the adjusting means 71 and 72, respectively. The shaft portions 73 and 74 of the adjusting means 71 and 72 respectively can be threadably mounted within the side wall of the casing 12 by virtue of the threaded shaft portions 73 and 74. The staple guide rack assembly 60 is mounted within the lower frame 12 by virtue of the supporting plates 75 and 76 or other suitable means.

An automatic version of the present stapler machine is illustrated in FIGS. 15, 16, and 17. The button stapler 80 comprises the upper frame support 81 and the lower frame support 82. These two members are operably connected to each other by virtue of the main pivot pin 83 whereby the members can be pivotly rotated toward each other. The upper frame member 81 is adapted to fit snugly within the extended side portions of the lower frame support member 82 to restrict lateral motion between these members. In this manner as in the embodiment of FIG. 1, the position of the staple bending guide means or anvil 18 with respect ot the staple guide rack 14 is accurately maintained. Additionally, the tolerance between the main pin means 83 and the bored portion of the upper frame 81 is maintained fairly close to prevent a loose fit and thus further restrict any lateral movement.

The lower frame support member 82 further comprises the staple guide rack means 14 which is slotted (16) to receive a staple, the tolerance being sufficient to allow a staple when positioned within the slot 16 to slide easily yet without any lateral motion. The lower frame support is provided, of course, with such refinements as the resting pads 17 and the like.

The upper frame support member 81 is operably connected to the staple bending guide means or anvil 18. As illustrated in FIG. 3 in the drawings, the anvil 18 further comprises the flange portion 19 which serves as a base for attachment to the upper frame support 81. The anvil 18 can comprise either the embodiment of FIG. 3 or FIG. 11.

To provide a continuous stapling operation, the base portion 82 is provided with the grooved portion 84 for receiving a length of staples 33 which nestle therein. The staples 33 are urged toward the staple guide rack 14 by virtue of the spring means 85 which is positioned under compression between the back wall 86 of the groove 84 and the staple guide follower 87. The latter member is provided with the extension 88 which moves through the slot 89 provided within the grooved portion 84. In this manner, the member 87 is prevented from jumping out and from becoming wedged in the groove 84. In loading the button stapler 80, the member 87 is withdrawn so as to place the spring 85 under tension and a row of staples 33 inserted in the groove 84. Upon release of the member 87, the spring 85 urges that member toward and into contact with the staples 33 which are shoved forward, thereby always maintaining a staple within the staple guide rack 14 for continuous stapling operation.

As in the embodiment of FIG. 1, the stapler 80 includes the cam lever arm means 90. The arm 90 is shaped such that its portion 91 contacts the driving lever 92 at one of its ends. The lever arm 90 is nestled within the members 81 and 82 in a fixed relationship by virtue of the pin means 83 about which it pivots or rotates relative to those members. The arm 90 is shaped such that its portion 91 contacts the driving lever 92 at one end thereof. The lever 92 is mounted within the lower frame member 82 such that it is allowed to reciprocate around the longitudinal axis of the driving lever pivot pin 93. The leaf spring means 94 is provided between the bottom portion of the member 82 and the driving lever 92 so as to urge upwards that end of the lever 92 that it contacts, the position shown in FIG. 15 being the relaxed position of the stapler when not in use. The driving plate 95 is provided at the other end of the lever 92 to which it is affixed in any convenient manner. As shown in FIG. 15, this can be accomplished by virtue of the extensions 96 provided on the lever 92 that are adapted to receive the driving plate pivot pin 97, the driving plate 95 having a hole drilled through its lower end for receiving the pin 97 whereby it can be pivotally mounted on the lever 92.

The release spring means 98 is positioned within the member 81 and is provided, together with the spring 94, for returning the cam lever arm 90 to a relaxed position after a fastening operation.

The overhead stop means 99 shown in FIG. 15 is provided for adjusting the extent of travel or operating clearance between the anvil 18 and the staple guide rack 14. The stop means 99 comprises the member 100 which is threaded at one end and adapted to mate with the nut 101 which is affixed to the upper frame member 81. In this manner, the stop member 99 can be adjusted upwards or downwards as chosen. One of the reasons for the stop means 99 is to prevent crushing of frangible buttons during a stapling operation, e.g. a cloth covered button including an aluminum or paper base.

The embodiment depicted in FIG. 15 operates in a fashion similar to the embodiment of FIG. 1. The different designs of anvil means and guide rack means can be interchanged between the two embodiments. Moreover, it will be apparent to one skilled in the art that many modifications and refinements can be made in the instant button stapler machine without departing from the true scope and intent of the instant invention. For example, as brought out supra, such elements as the springs employed in the present stapler can be substituted for other types of resilient means as well as be relocated within the structure of the machine. Additionally, the anvil 18 can comprise a series of different length slots adapted to accommodate buttons having different hole dimensions and the anvil being rotatably mounted in a turret fashion upon the upper frame member whereby the desired slot length can be dialed into position depending upon the size of button employed. In such an arrangement, the staple guide rack 14 would comprise an adjustable assembly such as that depicted in FIG. 9 or 13. Moreover, the body of the machine can be adapted to provide a compartment for staples and buttons. In short, considerable changes can be made in the present stapler machine as long as a staple, when acted upon, is deformed in the manner shown in FIG. 8.

It is to also be noted that the staple itself can be produced in such a design whereby the overall attractiveness of the product is yet further improved. For example, the external side of the staple that shows after an operation can be serrated so as to resemble many layers of thread as observed in the case of a button sewed in the conventional manner utilizing a needle and thread. Additionally, the staple can be punched or stamped to produce an appearance different from that above, as well as be colored, e.g. utilizing anodized aluminum as the staple material to thereby achieve diverse unique results. To facilitate bending the staple, it can comprise polytetrafluoroethylene (Teflon) or the like coated wire.

What I specifically desire to secure by United States Letters Patent is set forth in the appended claims.

I claim:

1. A button stapler comprising:
  (a) Clinching anvil means having at least two parallel staple guide grooves for guiding each end of an initially U shaped staple through two 90° angles whereby each end of the staple, after an operation, faces in a direction 180° from its original position and lies in a plane different from that established by the staple in its initial unbent condition;
  (b) Frame means which further comprises an upper frame member to which said clinching anvil means is operably connected and a lower frame support member operably connected to said upper frame member whereby said members can be pivoted around a common axis toward each other;
  (c) Means for connecting said frame members;
  (d) Staple guide means operably connected to said lower frame support member in alignment with said clinching anvil means positioned on said upper frame member, said staple guide means being further defined as having a staple guide channel therein whereby a U shape staple can be brought into accurate alignment with and deformed by said clinching anvil means;
  (e) Staple actuating means for bringing a U shaped staple into contact with said clinching anvil means whereby the staple is deformed in the process of attaching a button to a base material;
  (f) Said staple actuating means being further defined as comprising lever arm means operably positioned within said frame members and connected to said frame members by said means for connecting the frame members together about a common axis of rotation;
  (g) Driving lever means operably positioned within said lower frame support member in contact with said lever arm means, said driving lever means being further defined as having an extended staple driver portion which operably mates with the staple guide channel within said staple guide means, said driving lever means being mounted within said lower frame support member by virtue of pin means positioned within said lower frame support member and extending through said driving lever means which pivots about the longitudinal axis of said pin means;
  (h) Return spring means positioned between said lower frame support member and said driving lever means whereby said lever means is maintained in a fixed position in a relaxed condition; and
  (i) Relief spring means provided between said upper frame member and said lever arm means for urging said lever arm means upwards after its depression during a stapling operation, said lever arm means upon depression actuating said driving lever means which is thereby caused to pivot about said pin means whereby said driver means is caused to contact and shove a staple upwards that is positioned within the guide slot of said staple guide means whereupon the staple passes through the base material and into contact with said clinching anvil means by which it is deformed, thereby connecting the button to the base material.

2. The stapler of claim 1 further characterized in that said clinching anvil means has two pairs of parallel staple guide grooves for use with two different sizes of staples, the grooves being positioned relative to each other such that their longitudinal center lines are parallel.

3. The stapler of claim 1 further characterized in that said clinching anvil means has at least two pairs of parallel staple guide grooves, said guide means being rotatably mounted on said upper frame member whereby a selected pair of grooves can be dialed into alignment with said staple guide means.

4. The stapler of claim 1 further characterized in that said staple guide means is operably connected to said lower frame support member by clip means whereby said rack means can be easily removed for replacement.

5. The stapler of claim 1 further characterized in that said staple guide means further comprises:
  (a) A main guide frame provided with extended portions on two opposite sides so as to assume a T-shaped configuration, said guide frame also being provided with a slot therethrough extending vertically relative to the plane established by said extended portions, the slot being of a width sufficient to receive a staple;
  (b) Slidable block means operably positioned on the sides of said frame means having said extended portions on which said block means are slidable toward each other, each of said block means being further defined as having an elongated extended portion adapted to fit within theslot provided within said main guide frame and provided with a groove along its inner side extending parallel with the slot within said main guide frame and adapted to receive said staple driver portion of said driving lever means whereby a staple confined between the inner sides of said elongated extended portions slidably positioned within the slot can be shoved upwards by said driver portion; and
  (c) Positioning means operably connected to said slidable block means for adjusting the distance between said means whereby a staple positioned within the slot in said guide frame can be confined to restrict its lateral movement.

6. The stapler of claim 1 further defined in that said lower frame support member further comprises:
  (a) A U shaped portion adapted to receive a plurality of staples, said portion being in open communication with the slot provided within said staple guide rack means;
  (b) Guide means for guiding the staples positioned within said U shaped portion; and
  (c) Resilient spring means fo rcontinually urging the staples within said U shaped portion toward said rack means whereby a new staple is shoved into position after a stapling operation so as to provide continuous operation.

References Cited

UNITED STATES PATENTS

| 1,956,174 | 4/1934 | Maynard | 227—155 |
| 2,506,038 | 5/1950 | Rakusin | 227—124 |
| 2,538,255 | 1/1951 | Lyon | 227—144 XR |
| 2,702,383 | 2/1955 | Buechler | 227—134 |
| 2,735,094 | 2/1956 | Plotkin | 227—134 |

FOREIGN PATENTS

| 189,102 | 9/1907 | Germany. |
| 190,049 | 10/1907 | Germany. |

GRANVILLE Y. CUSTER, JR., Primary Examiner

U.S. Cl. X.R.

227—124, 144, 155